Sept. 30, 1924.
W. LACHMANN
RECTIFYING COLUMN
Filed Jan. 3, 1921
1,510,178
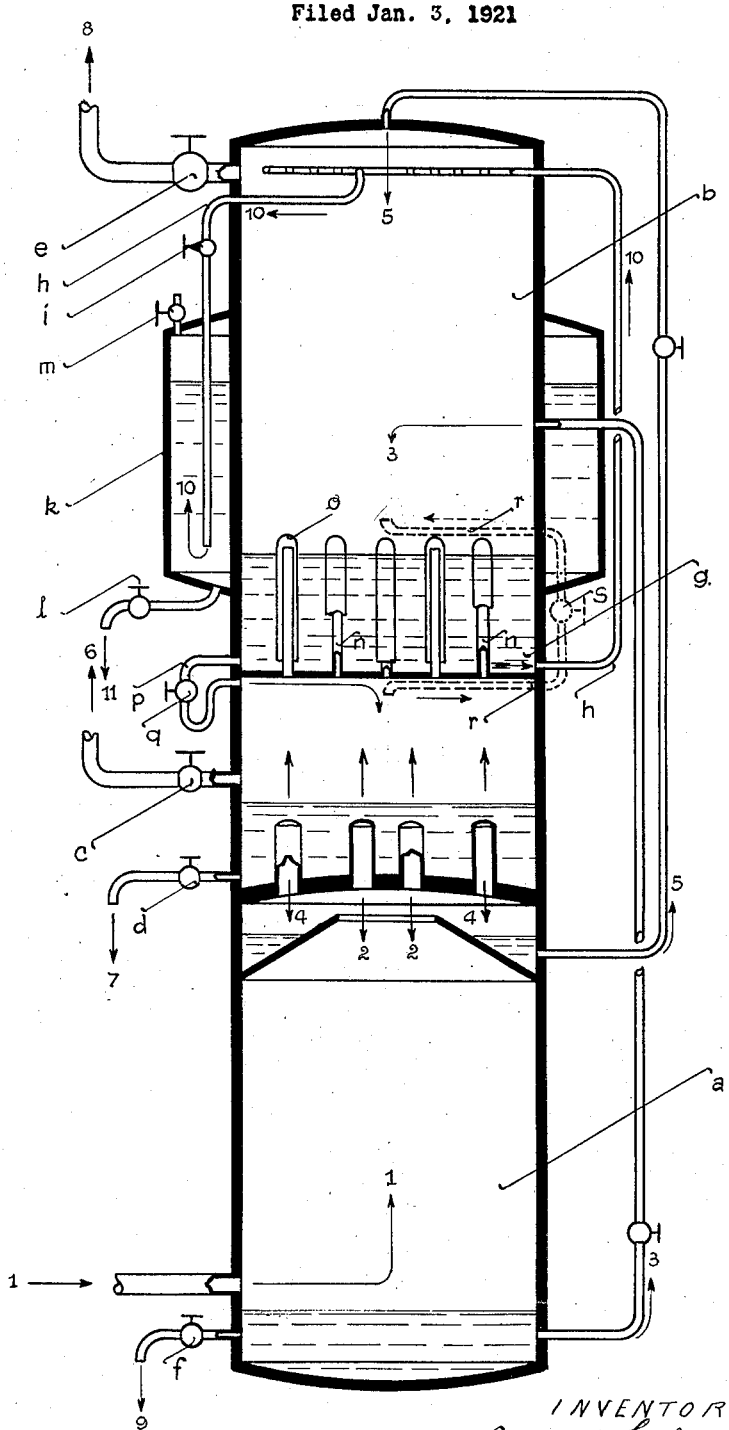
INVENTOR:
Walter Lachmann
By Wm Wallace White
ATTY.

Patented Sept. 30, 1924.

1,510,178

UNITED STATES PATENT OFFICE.

WALTER LACHMANN, OF DRESDEN, GERMANY.

RECTIFYING COLUMN.

Application filed January 3, 1921. Serial No. 434,835.

(GRANTED UNDER THE PROVISIONS OF THE ACT OF MARCH 3, 1921, 41 STAT. L., 1313.)

*To all whom it may concern:*

Be it known that I, WALTER LACHMANN, a citizen of the German Republic, residing at 1 Wormserstrasse, Dresden, Saxony, Germany, have invented certain new and useful Improvements in Rectifying Columns, of which the following is a specification, and for which he has filed an application for patent in Germany under date of February 15, 1917.

Liquid oxygen, 80% to 90% pure, for blasting purposes in mines has hitherto been produced by causing a rectifying column to operate in such a manner that the separated product obtained at the bottom of the column is liquid oxygen of the desired purity.

The present invention relates to a rectifying column which is adapted to produce from a mixture of nitrogen and oxygen not only a liquid of the above-mentioned kind which is rich in oxygen, but also oxygen of a quality worth compressing, so that in industrial establishments one and the same fractional distillation plant may be used for obtaining blasting air and at the same time oxygen of a high degree of purity for autogeneous welding and cutting. For the sake of brevity it will be assumed hereinafter that the mixture of nitrogen and oxygen dealt with is air. Instead of the rectifying column operating to produce pure gaseous oxygen it may be caused to also produce oxygen in a liquid form.

Since the percentage of oxygen in the liquid trickling down the column increases during its passage from the top to the bottom, the said result may be brought about by extracting liquid from the column at the particular part midway between the top and bottom where the composition of the liquid renders it suitable for use as blasting air, while pure oxygen is extracted at the bottom of the column. Contrary to expectation this extraction of liquid from the middle part of the column does not cause any difficulties in operating with the column.

A constructional form of a column in accordance with the invention is shown in vertical section in the drawing. In reality the hollow spaces in the column are furnished with perforated plates or glass beads and the like, or with any other suitable rectifying arrangement which is omitted in the drawing in order to render the illustration clearer and simpler. In general the operation of the column is similar to that described in the patents of Hazard and Flamand (British Patent No. 26,720 of 1908, Fig. 5, and French Patent No. 394,881, Fig. 5) whose process is very similar to the known process of Claude. In the former, two processes are combined, viz, 1, the process of heating with the air of the atmosphere, which is limited to the bottom end of the column, or distributed over any desired part of its height, and 2, the preparatory separation of the air, viz, in the part *a* while the final products are obtained in the part *b* of the column. Hence the separation of the constituents of the air commences in the chamber *a* and finishes in the chamber *b*. In the chamber *a* a fraction 3 containing 30 to 50 per cent of oxygen is produced and liquefied and then conducted into the actual rectifying column *b* at its middle portion. In addition to this a fraction 5 composed of pure nitrogen is forced in a liquid form up to the top end of the column *b* so as to enable pure nitrogen to be obtained. Besides, the chamber *b* is provided at its lower end with two outlets *c* and *d* for gaseous oxygen 6 and liquid oxygen 7 respectively, and at its upper end it has an outlet *e* for nitrogen 8. The separating column *a* is also provided at its lower end with an outlet *f* for the liquid 9 that is identical with the product 3 obtained by the preparatory separating or condensing process. 2 is liquid nitrogen produced by cooling and thus condensing the nitrogen of the bottom chamber *a*, and 4 is also liquid nitrogen.

An important feature of the present invention consists in the chamber *b* being provided with a compartment *g* from which blasting air 10 can be extracted through a pipe *h* equipped with a regulating device or valve *i*. As illustrated in the drawing, the discharge pipe *h* before terminating at its mouth may be led through the coldest, uppermost parts of the rectifying column in order to cool down the liquid and to reduce the losses due to evaporation at its expansion.

The said compartment *g* serves to facilitate the extraction and storing of the blasting air and is therefore preferably made of a considerable size. Considerable quantities of blasting air can then be taken out whenever such air is required, or when the said compartment is full and is to be emptied. But blasting air may also be stored outside of the compartment and the actual rectifying column. It may for example be conducted straight into liquid air vessels for transportation, or it may be first stored in an annular cistern *k* that surrounds the column, and is provided with an outlet *l* for blasting air 11, The cistern *k* may be open at the top or, as shown in the drawing, closed and equipped with an upper air discharge valve *m* which may also serve as a pressure balancing valve, so that the valve *i* could be dispensed with.

After its discharge and expansion the percentage of oxygen in the blasting air 11 may be increased by mixing it with liquid oxygen taken from the tap *d*. But above all the said percentage may be reduced by mixing the blasting air with the liquid product 9 obtained in the preliminary separation process. To enable the oxygen or preliminary liquid product to be tapped off as required for making the said mixtures, the evaporator of the chamber *b* and the lower end of the preliminary separation chamber *a*, are equipped with the aforementioned taps *d* and *f* respectively. But taps of small cross section such as those which have been used occasionally merely for drawing off samples would not do for this purpose.

A means for quickly and easily increasing the percentage of oxygen contained in the blasting air before it is tapped off from the compartment *g* is the following: The discharge of oxygen (6 or 7) that is ready for use, is reduced to such an extent that most of the oxygen in the column streams upwards, and in so doing thoroughly heats the compartment *g* and its contents, thus causing nitrogen to evaporate and the percentage of oxygen contained in the liquid to be increased as desired. The heating of the compartment *g* may be carried out in the following ways:

By blowing the vapors through the chamber *g* they are brought into direct contact with the liquid contents of the said chamber. Heat will then be given off in the desired manner and a perfect fractional evaporation will take place. To this end the upwardly extending pipes *n* provided in the compartment *g* are equipped with tubular hoods *o* closed at the top and having their bottom ends low enough to dip under the lowest level to which the liquid sinks. In order to enable a certain quantity of liquid to be conducted through the lower chamber of the column also, a pipe *p* is provided which leads from this chamber and issues in chamber *g* just above its bottom. The pipe *p* is equipped with a cock *q* by which the amount of liquid that passes into the lower chamber can be regulated. This amount will remain almost constant regardless of the level of the liquid, because as the latter rises the counter-pressure in the lower chamber will increase in the same proportion.

The pipes *n* that are covered with hoods may also serve to constantly conduct a sufficient quantity of vapors from the chamber situated beneath the compartment *g* into the chamber above it. This, however, would involve the slight disadvantage that the vapors would have to overcome a counter-pressure that corresponds to the level of the liquid in *g*, and that varies in accordance with this level. At a level of the liquid amounting to 30 cms. for instance this counter-pressure would be approximately 1/30 of an atmosphere. This slight drawback may be eliminated by using the said pipes *n* only for heating in the described manner whenever this should prove necessary and by making provision for the passage of vapor, which is required for the rectification process, by equipping the column with a permanently fitted pipe (or pipes) *r* that is open at both ends and either forms a side passage as indicated, or extends in a straight line from the chamber beneath *g* through the whole compartment *g* parallel to the longitudinal axis of the column. Means, such as a valve or a throttling member *s* must be provided for closing this pipe *r* so as to enable the pipes *n* to be put into operation when required.

It might be supposed that a method of reducing the percentage of oxygen contained in the liquid 10 of the collecting compartment *g* would be to increase the discharge of the product 6 or 7 (oxygen) obtained beneath the compartment. But generally speaking this would be a great mistake, because by this increased discharge the lower oxygen 6 (or 7) would become so rich in nitrogen as to be useless. Thus the only proper way to obtain a liquid comparatively poor in oxygen is that already described, viz., to mix the blasting air 11 with the liquid product 9 obtained by the preliminary process of separation.

The above description does not apply only to blasting air, but also to liquid air rich in oxygen, as that employed in coal mines in case of fire-damp explosions and for breathing purposes on air-ships and aeroplanes at great altitudes, and to liquefied gas containing a high precentage of oxygen, but whose oxygen component is to be increased through long storage and the inevitable evaporation resulting therefrom to such an extent as to render it serviceable for technical purposes, as for the autogenous welding and cutting of metals for which oxygen of great purity is necessary. Instead of producing the purest oxygen gas for this purpose and compressing it in steel bottles, or conducting it under a low pressure to the point of consumption, a rectifying column may be used which produces at its bottom chambers a liquid rich in oxygen but still containing 5 to 15% of nitrogen, and this liquid may be kept and dispatched in the known vessels for storing liquid air, in which the oxygen component of the liquid increases automatically through the inevitable evaporation that takes place. Through the nitrogen component of the liquid being large when the liquid is first filled into the carrying vessels the vapors rising therefrom will also be rich in nitrogen and hereby the losses of oxygen, which in this case is the more valuable product of separation, are considerably diminished. If desired, the evaporation alluded to can be accelerated, as by inserting metal rods into the liquid, which will then conduct an increased amount of warmth into it from the atmosphere.

It will be obvious that my invention is not only applicable for the production of blasting air and the like from mixtures of nitrogen and oxygen, but that it may also be used without change for separating the components of other gas mixtures which are hard to liquefy.

I claim:

1. A rectifying column for separating the components of gas mixtures, comprising a vessel divided into a rectifying chamber and a preparatory separating chamber disposed below said rectifying chamber, said separating chamber having near its upper end a centrally perforated partition forming a liquid compartment and said rectifying chamber being subdivided into an upper compartment and a lower compartment, said upper compartment being adapted to contain a liquid, a pipe communicating with the separating chamber adjacent to the bottom thereof and with the upper compartment of the rectifying chamber at approximately the center of its height, a pipe communicating with the liquid compartment at the upper end of the separating chamber and with the upper end of said upper compartment, a condenser-vaporizer communicating with the separating chamber above its upper liquid compartment and extending into the lower compartment of the rectifying chamber, warming means extending into the upper compartment from the bottom thereof, said warming means being adapted to conduct vapors from the lower compartment into the upper compartment through a liquid contained in said upper compartment, a by-pass communicating with the upper compartment near its bottom and with the lower compartment near the top thereof, a by-pass communicating with the lower compartment near the top thereof and with the upper compartment at a point remote from its bottom, valve-controlled outlets for drawing off the liquid from the lower end of the separating chamber and the lower compartment of the rectifying chamber, a valve-controlled outlet for drawing off the gas from said lower compartment, and an inlet for supplying the gas mixture to the separating chamber.

2. A rectifying column for separating the components of gas mixtures, comprising a vessel divided into a rectifying chamber and a preparatory separating chamber disposed below said rectifying chamber, said separating chamber having near its upper end a centrally perforated partition forming a liquid compartment and said rectifying chamber being subdivided into an upper compartment and a lower compartment, said upper compartment being adapted to contain a liquid, a pipe communicating with the separating chamber adjacent to the bottom thereof and with the upper compartment of the rectifying chamber at approximately the center of its height, a pipe communicating with the liquid compartment at the upper end of the separating chamber and with the upper end of said upper compartment, a condenser-vaporizer communicating with the separating chamber above its upper liquid compartment and extending into the lower compartment of the rectifying chamber, warming means extending into the upper compartment from the bottom thereof, said warming means being adapted to conduct vapors from the lower compartment into the upper compartment through the liquid contained in said upper compartment, a by-pass communicating with the lower compartment near the top thereof and with the upper compartment at a point remote from its bottom, valve-controlled outlets for drawing off the liquid from the lower end of the separating chamber and the lower compartment of the rectifying chamber, a valve-controlled outlet for drawing off the gas from said lower compartment, an inlet for supplying the gas mixture to the separating chamber, a storage receptacle encircling said rectifying chamber, and a pipe communicating with said upper compartment near its bottom and with said storage receptacle.

In testimony whereof I have signed this specification in the presence of two witnesses.

WALTER LACHMANN.

Witnesses:
Dr. HERMANN HAHLE,
D. VOLKMAR KLOPFER.